United States Patent
Chosta et al.

(10) Patent No.: US 12,490,951 B2
(45) Date of Patent: Dec. 9, 2025

(54) METHODS AND SYSTEMS FOR GUIDING USER TO PERFORM MEDICAL IMAGING

(71) Applicant: Medtronic Navigation, Inc., Louisville, CO (US)

(72) Inventors: Henry Chosta, Northbridge, MA (US); Rasika A. Parkar, Wayland, MA (US); Kyo C. Jin, Durham, NH (US); Robert A. Simpson, Shirley, MA (US); Krisha D. Nazareth, Hudson, MA (US); Stephanie Arce, Needham, MA (US); Xavier Tomas Fernandez, Jamaica Plain, MA (US)

(73) Assignee: Medtronic Navigation, Inc., Lafayette, CO (US)

( * ) Notice: Subject to any disclaimer, the term of this patent is extended or adjusted under 35 U.S.C. 154(b) by 233 days.

(21) Appl. No.: 17/745,316

(22) Filed: May 16, 2022

(65) Prior Publication Data
US 2023/0363733 A1    Nov. 16, 2023

(51) Int. Cl.
*A61B 6/00* (2024.01)
*A61B 6/46* (2024.01)

(52) U.S. Cl.
CPC ............ *A61B 6/547* (2013.01); *A61B 6/4441* (2013.01); *A61B 6/4447* (2013.01); *A61B 6/466* (2013.01); *A61B 6/487* (2013.01); *A61B 6/488* (2013.01)

(58) Field of Classification Search
CPC ....... A61B 6/547; A61B 6/4441; A61B 6/466; A61B 6/487; A61B 6/488; A61B 2034/252; A61B 34/25; A61B 6/0492; A61B 6/5241; A61B 2034/2051; A61B 2034/2055; A61B 2090/365; A61B 2090/376; A61B 6/4447; A61B 6/4476; A61B 6/545; A61B 6/587; A61B 6/586; A61B 34/20; G01N 23/046
See application file for complete search history.

(56) References Cited

U.S. PATENT DOCUMENTS

| | | |
|---|---|---|
| 7,103,134 B2 | 9/2006 | Suzuki |
| 7,265,355 B2 | 9/2007 | Chang et al. |
| 8,238,631 B2 | 8/2012 | Hartmann et al. |
| 9,411,057 B2 | 8/2016 | Helm et al. |
| 9,807,860 B2 | 10/2017 | Helm et al. |
| 9,867,588 B2 | 1/2018 | Amiri |

(Continued)

FOREIGN PATENT DOCUMENTS

| | | | |
|---|---|---|---|
| CN | 111789606 A | * 10/2020 | ............. A61B 6/032 |
| EP | 3513729 A1 | 7/2019 | |

OTHER PUBLICATIONS

Translation of CN111789606A (Year: 2020).*

(Continued)

*Primary Examiner* — David P Porta
*Assistant Examiner* — Mamadou Faye

(57) ABSTRACT

An imaging system for generating an x-ray image of a subject. The imaging system including an imaging gantry having an x-ray emitter for emitting x-rays through the subject and an x-ray detector for detecting the x-rays that have passed through the subject. The imaging gantry is movable relative to the subject. The imaging system further including a control system configured to provide a user of the imaging system with a quick, easy, and efficient workflow of the imaging system to lead the user through a series of well-defined steps for setting up the imaging system.

19 Claims, 11 Drawing Sheets

(56) References Cited

U.S. PATENT DOCUMENTS

| | | | |
|---|---|---|---|
| 10,702,242 | B2 | 7/2020 | de Jonge et al. |
| 10,758,210 | B2 | 9/2020 | Huber et al. |
| 10,881,371 | B2 | 1/2021 | Helm et al. |
| 11,769,261 | B2 | 9/2023 | Tomas Fernandez et al. |
| 2004/0101105 | A1* | 5/2004 | Segawa ................. A61B 6/032 |
| | | | 378/108 |
| 2014/0132268 | A1 | 5/2014 | Nagao et al. |
| 2016/0270748 | A1* | 9/2016 | Garlow ............... A61B 6/4476 |
| 2018/0153488 | A1 | 6/2018 | Ancar |
| 2019/0150865 | A1* | 5/2019 | Johnson ............... A61B 6/4405 |
| 2020/0205763 | A1* | 7/2020 | Helm ...................... G06T 3/14 |
| 2020/0279640 | A1 | 9/2020 | Amthor et al. |
| 2021/0045707 | A1* | 2/2021 | Sosenko ................. A61B 6/06 |
| 2021/0142895 | A1 | 5/2021 | Schmidt et al. |
| 2023/0133721 | A1* | 5/2023 | Mc Carthy ............ A61B 6/544 |
| | | | 378/98 |

OTHER PUBLICATIONS

International Search Report and Written Opinion for related International Application No. PCT/IB2023/054973; dated: Jul. 12, 2023; 11 pages.

* cited by examiner

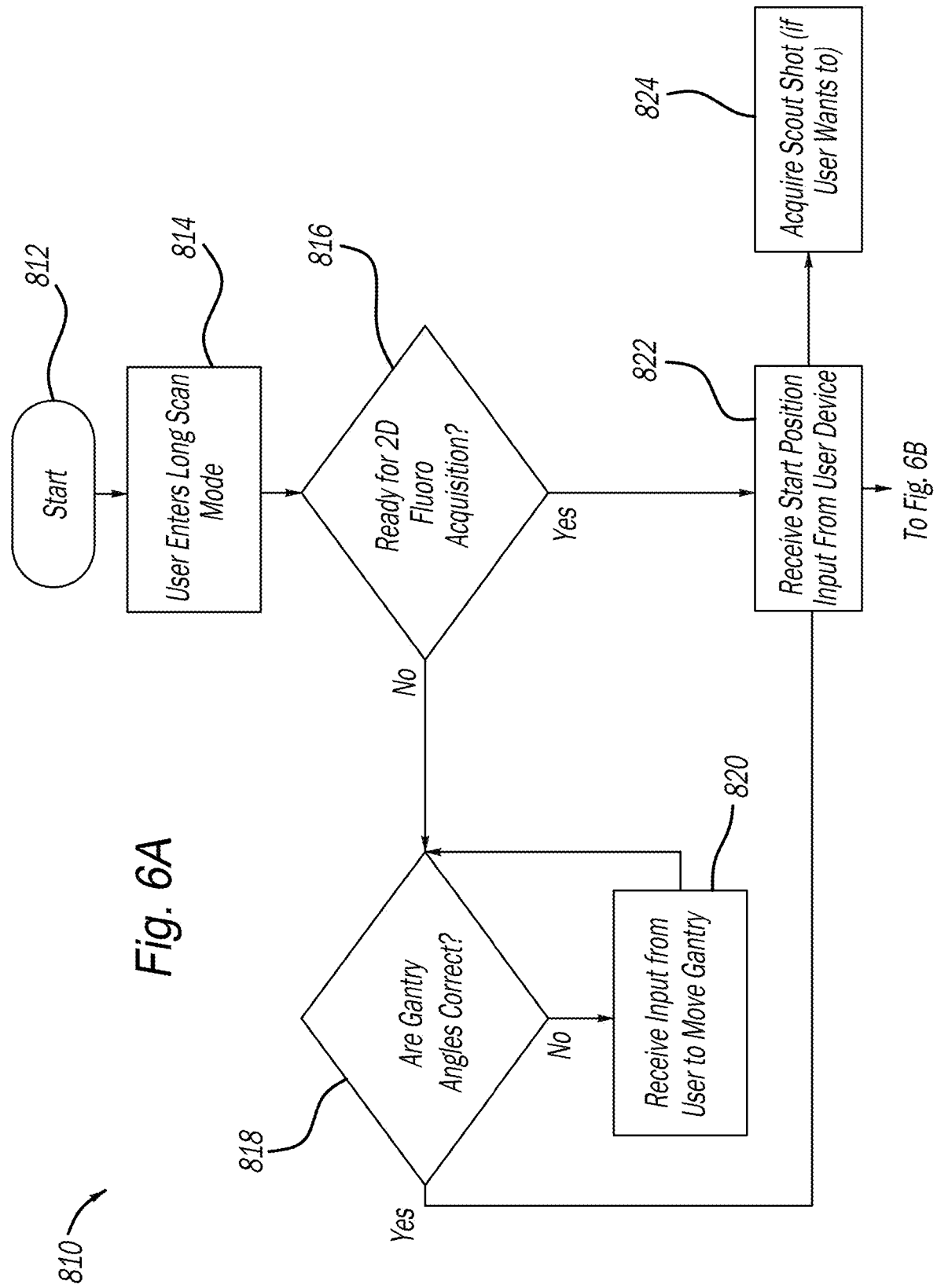

METHODS AND SYSTEMS FOR GUIDING USER TO PERFORM MEDICAL IMAGING

FIELD

The present disclosure relates to methods and systems for guiding a user to perform medical imaging.

BACKGROUND

This section provides background information related to the present disclosure, which is not necessarily prior art.

Imaging systems acquire image data of a subject. The image data may be used to generate images. The images may be displayed for viewing by a user and/or further analyzed and/or augmented for various purposes. The images may illustrate selected portions of a subject.

An imaging system that acquires image data of the subject may acquire a plurality of image data projections of the subject. The plurality of projections may be acquired at a plurality of positions of the imaging system relative to the subject. For example, a system may include an arm or a projector that moves in space relative to a subject to acquire a plurality of positions of image projections relative to the subject. While current imaging systems are suitable for their intended use, they are subject to improvement. The present disclosure advantageously provides for improved methods and systems for guiding a user perform medical imaging with any suitable imaging systems.

SUMMARY

This section provides a general summary of the disclosure, and is not a comprehensive disclosure of its full scope or all of its features.

The present disclosure provides for an imaging system for generating image data of a subject. The imaging system includes a radiation emitter for emitting radiation through the subject, a radiation detector for detecting radiation from the radiation emitter that has passed through the subject, and an imaging assembly including the radiation emitter and the radiation detector. The imaging assembly is configured to move the radiation emitter and the radiation detector relative to the subject. A control system of the imaging system is configured to: identify positions of the radiation emitter and the radiation detector relative to the subject prior to imaging the subject; and notify a user of the imaging system when either one of the radiation emitter and the radiation detector is not at a predetermined start angle relative to the subject prior to imaging the subject. When either one of the radiation emitter and the radiator detector is not at the predetermined start angle relative to the subject prior to imaging the subject, the control system is configured to generate instructions to the user by way of a user interface for adjusting the imaging assembly so that the radiation emitter and the radiator detector are both at the predetermined start angle relative to the subject prior to imaging the subject. The control system is also configured to restrict operation of the radiation emitter until both the radiation emitter and the radiator detector are at their predetermined start angle relative to the subject.

The present disclosure further provides for an imaging system for generating an x-ray image of a subject. The imaging system includes an imaging gantry having an x-ray emitter for emitting x-rays through the subject and an x-ray detector for detecting the x-rays that have passed through the subject. The imaging gantry is movable relative to the subject. The imaging system further includes a control system configured to: identify position of the imaging gantry prior to imaging the subject, including a gantry wag angle and a gantry tilt angle of the imaging gantry; notify a user of the imaging system when the gantry wag angle and the gantry tilt angle are at angles other than 0° prior to imaging the subject; when at least one of the gantry wag angle and the gantry tilt angle are not at 0° prior to imaging the subject, generate instructions to the user by way of a user interface for adjusting the imaging gantry so the gantry wag angle and the gantry tilt angle are at 0°; and restrict operation of the x-ray emitter until the gantry wag angle and the gantry tilt angle are at 0°.

The present disclosure also provides for a method for setting an imaging system to generate an x-ray image of a subject. The imaging system includes a control module and an imaging gantry having an x-ray emitter for emitting x-rays through the subject and an x-ray detector for detecting the x-rays that have passed through the subject. The imaging gantry is movable relative to the subject. The method is performed by the control module and incudes the following: identifying a position of the imaging gantry prior to imaging the subject, including a gantry wag angle and a gantry tilt angle of the imaging gantry; notifying a user of the imaging system when the gantry wag angle and the gantry tilt angle are at angles other than 0° prior to imaging the subject; when at least one of the gantry wag angle and the gantry tilt angle are not at 0° prior to imaging the subject, generating instructions to the user by way of a user interface for adjusting the imaging gantry so the gantry wag angle and the gantry tilt angle are at 0°; and restricting operation of the x-ray emitter until the gantry wag angle and the gantry tilt angle are at 0°.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Figure 6B:
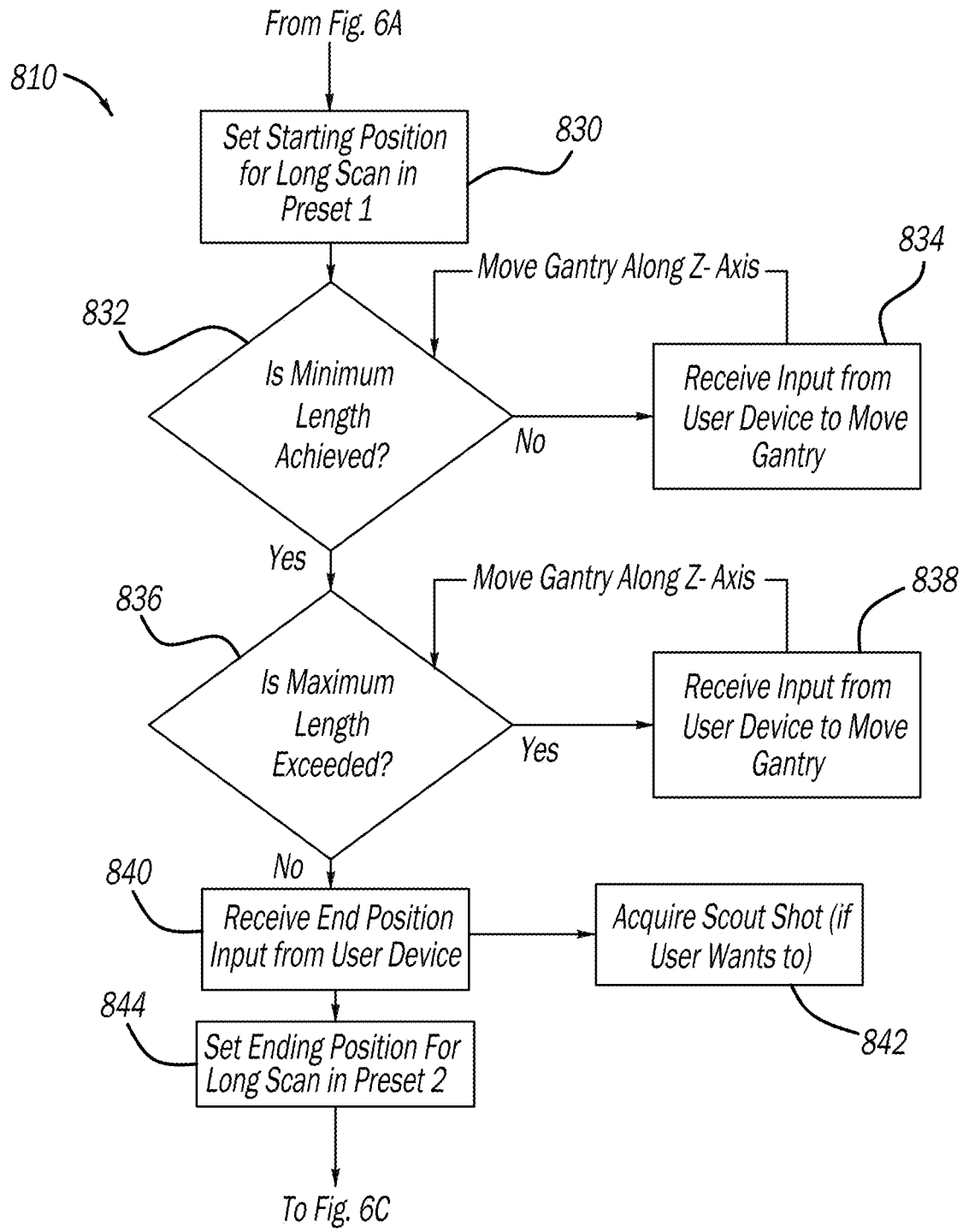
Figure 6C:
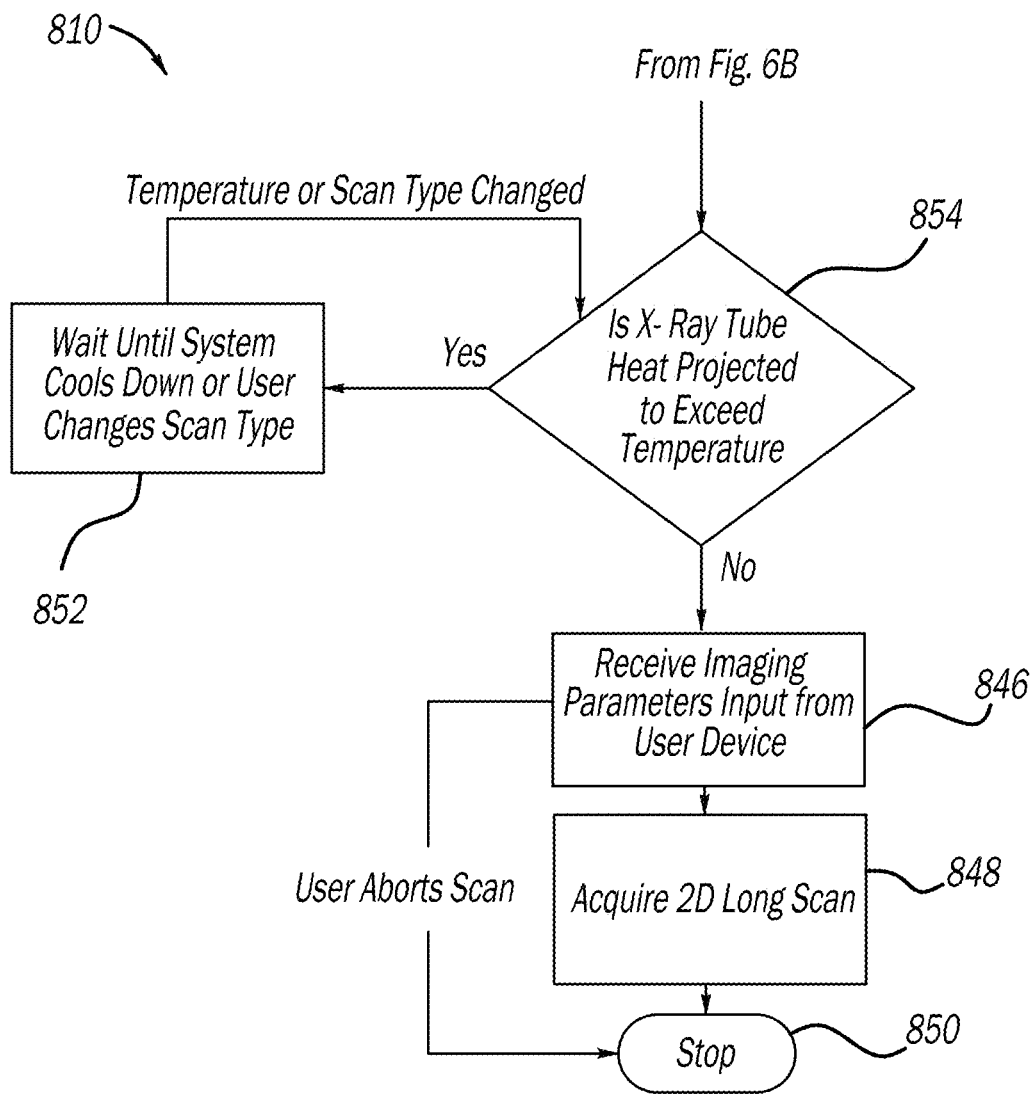

FIGS. 5A, 5B, 5C, and 5D illustrate a flow chart of an additional method for performing medical imaging in accordance with the present disclosure; and FIGS. 6A, 6B, 6C illustrate a flow chart of another method for performing medical imaging in accordance with the present disclosure.

Corresponding reference numerals indicate corresponding parts throughout the several views of the drawings.

DETAILED DESCRIPTION

Example embodiments will now be described more fully with reference to the accompanying drawings.

Figure 1:
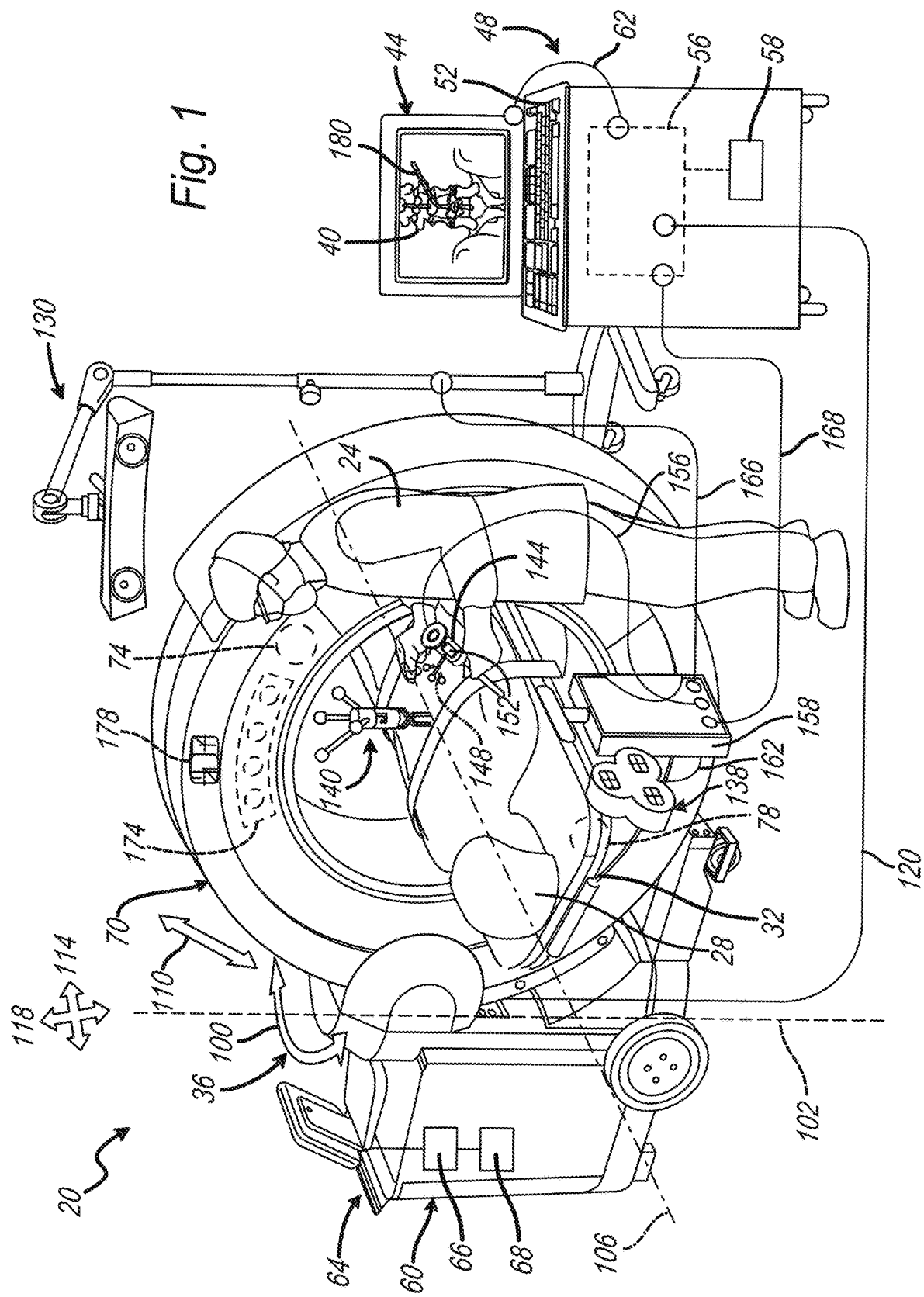
FIG. 1 is an environmental view of an exemplary imaging system.

With reference to FIG. 1, a schematic view of a procedure room 20 is illustrated. A user 24, such as a surgeon, can perform a procedure on a subject, such as a patient 28. The subject may be placed on a support, such as a table 32, for a selected portion of the procedure. The table 32 generally may not interfere with image data acquisition with an imaging system 36. In performing the procedure, the user 12 can use the imaging system 36 to acquire image data of the patient 28 to allow a selected system to generate or create images to assist in performing a procedure. Images generated with the image data, such as a model (such as a two-dimension (2D) or three-dimensional (3D) image), long views, single projections views, etc. can be generated using the image data and displayed as an image 40 on a display device 44. The display device 44 can be part of and/or connected to a processor system 48 that includes an input device 52, such as a keyboard, and a processor 56, which can include one or more processors or microprocessors incorporated with the processing system 48 along with selected types of non-transitory and/or transitory memory 58. A connection 62 can be provided between the processor 56 and the display device 44 for data communication to allow driving the display device 44 to display or illustrate the image 40. The processor 56 may be any appropriate type of processor, such as a general purpose processor that executes instructions included in a program or an application specific processor, such as an application specific integrated circuit.

The imaging system 36 can include an O-Arm® imaging system sold by Medtronic Navigation, Inc. having a place of business in Louisville, CO, USA. The imaging system 36, including the O-Arm® imaging system, or other appropriate imaging systems may be in use during a selected procedure, such as the imaging system described in following references, all of which are incorporated herein by reference: U.S. Pat. Nos. 10,881,371; 9,411,057; 9,807,860; 8,238,631; and U.S. patent application Ser. No. 17/205,940 filed on Mar. 18, 2021.

The imaging system 36, when, for example, including the O-Arm® imaging system, may include a mobile cart 60 that includes a controller and/or control system 64. The control system 64 may include a processor and/or processor system 66 (similar to the processor 56) and a memory 68 (e.g. a non-transitory memory). The memory 68 may include various instructions that are executed by the processor 66 to control the imaging system 36, including various portions of the imaging system 36.

The imaging system 36 may include further additional portions, such as an imaging gantry 70 in which is positioned a source unit (also referred to as an assembly) 74 and a detector unit (also referred to as an assembly) 78. The gantry 70 is moveably connected to the mobile cart 60. The gantry 70 may be O-shaped or toroidal shaped, wherein the gantry 70 is substantially annular and includes walls that form a volume in which the source unit 74 and detector 78 may move. The mobile cart 60 may also be moved, and can be moved from one operating theater to another and or another room. The gantry 70 can move relative to the cart 60, as discussed further herein. This allows the imaging system 36 to be mobile and moveable relative to the subject 28 thus allowing it to be used in multiple locations and with multiple procedures without requiring a capital expenditure or space dedicated to a fixed imaging system. Although the imaging system 36 is described as including a gantry, the imaging system 36 may include any other suitable assembly for the source unit 74 and the detector 78, such as a c-arm for example.

The processor 66 may be a general purpose processor or a specific application processor. The memory system 68 may be a non-transitory memory such as a spinning disk or solid state non-volatile memory. In various embodiments, the memory system may include instructions to be executed by the processor 66 to perform functions and determine results, as discussed herein.

In various embodiments, the imaging system 36 may include an imaging system that acquires images and/or image data by emitting x-rays and detecting interactions and/or attenuations of the x-rays with the subject 28. Thus, x-ray imaging may be an imaging modality. It is understood that other imaging modalities are possible and may be used.

Figure 2:
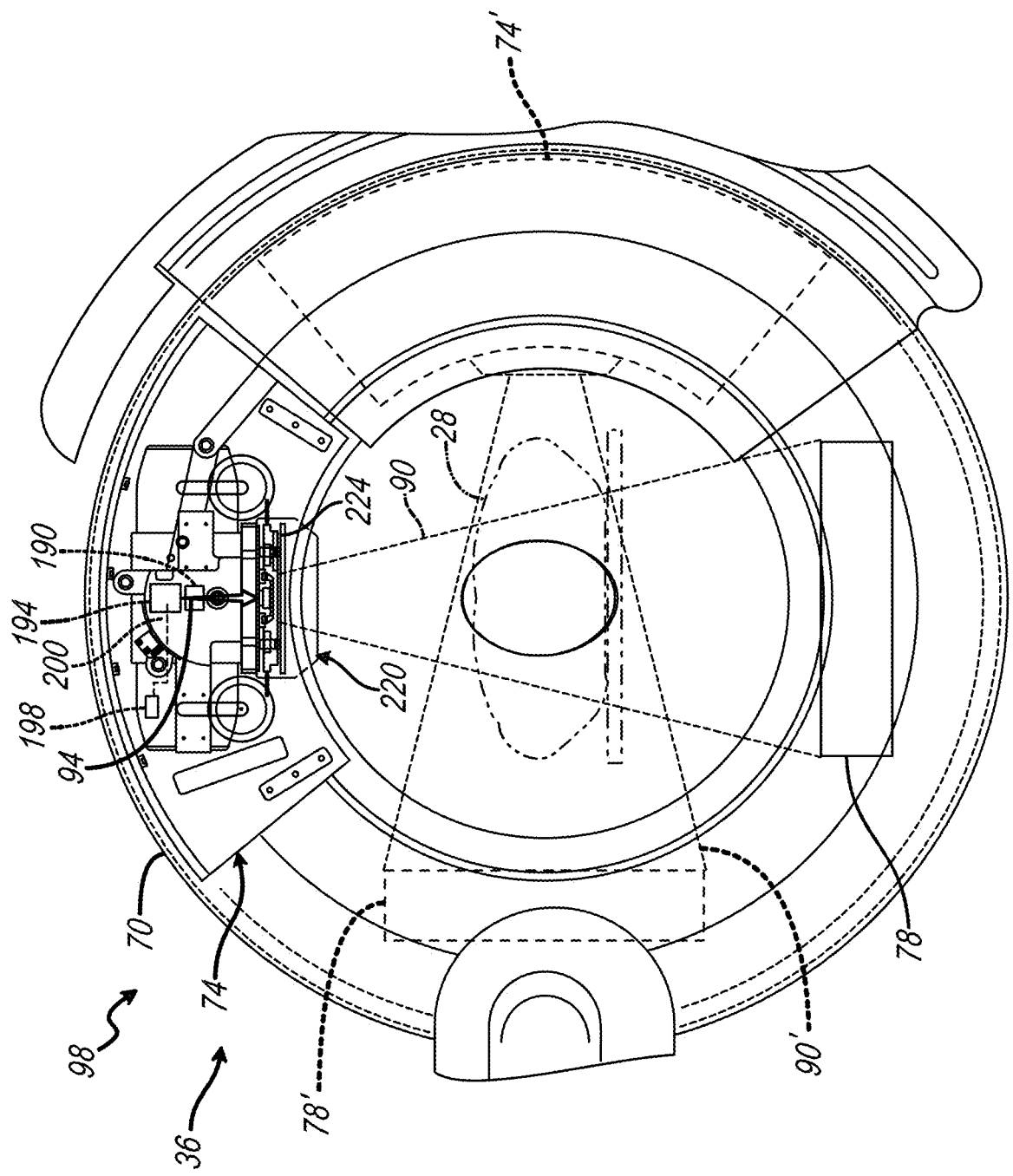
FIG. 2 illustrates additional details of the exemplary imaging system of FIG. 1.

Thus, the imaging system 36 that includes the source unit 74 may be an x-ray emitter that can emit x-rays through the patient 28 to be detected by the detector 78. As is understood by one skilled in the art, the x-rays emitted by the source 74 can be emitted in a cone 90 along a selected main vector 94 and detected by the detector 78, as illustrated in FIG. 2. The source 74 and the detector 78 may also be referred to together as a source/detector unit 98, especially wherein the source 74 is generally diametrically opposed (e.g., 180 degrees apart) from the detector 78 within the gantry 70.

The imaging system 36 may move, as a whole or in part, relative to the subject 28. For example, the source 74 and the detector 78 can move in a 360° motion around the patient 28. The movement of the source/detector unit 98 within the gantry 70 may allow the source 74 to remain generally 180° opposed (such as with a fixed inner gantry or rotor or moving system) to the detector 78. Thus, the detector 78 may be referred to as moving around (e.g., in a circle or spiral) the subject 28 and it is understood that the source 74 is remaining opposed thereto, unless disclosed otherwise.

Also, the gantry 70 can move isometrically (also referred as "wag") relative to the subject 28 generally in the direction of arrow 100 around an axis 102, such as through the cart 60, as illustrated in FIG. 1. The gantry 34 can also tilt relative to a long axis 106 of the patient 28 illustrated by arrows 110. In tilting, a plane of the gantry 70 may tilt or form a non-orthogonal angle with the axis 106 of the subject 28.

The gantry 70 may also move longitudinally in the direction of arrows 114 along the line 106, which is the z-axis, relative to the subject 28 and/or the cart 60. Also, the cart 60 may move to move the gantry 70. Further, the gantry 70 can move up and down generally in the direction of arrows 118 relative to the cart 30 and/or the subject 28, generally transverse to the axis 106 and parallel with the axis 102.

The movement of the imaging system 36, in whole or in part, is to allow for positioning of the source/detector unit (SDU) 98 relative to the subject 28. The imaging device 36 can be precisely controlled to move the SDU 98 relative to the subject 28 to generate precise image data of the subject 28. The imaging device 36 can be connected with the processor 56 via a connection 120, which can include a wired or wireless connection or physical media transfer from the imaging system 36 to the processor 56. Thus, image data collected with the imaging system 36 can be transferred to the processing system 56 for navigation, display, reconstruction, etc.

The source 74, as discussed herein, may include one or more sources of x-rays for imaging the subject 28. In various embodiments, the source 74 may include a single source that may be powered by more than one power source to generate and/or emit x-rays at different energy characteristics. Further, more than one x-ray source may be the source 74 that may be powered to emit x-rays with differing energy characteristics at selected times.

According to various embodiments, the imaging system 36 can be used with an un-navigated or navigated procedure. In a navigated procedure, a localizer and/or digitizer, including either or both of an optical localizer 130 and/or an electromagnetic localizer 138 can be used to generate a field and/or receive and/or send a signal within a navigation domain relative to the subject 28. The navigated space or navigational domain relative to the subject 28 can be registered to the image 40. Correlation, as understood in the art, is to allow registration of a navigation space defined within the navigational domain and an image space defined by the image 40. A patient tracker or dynamic reference frame 140 can be connected to the subject 28 to allow for a dynamic registration and maintenance of registration of the subject 28 to the image 40.

The patient tracking device or dynamic registration device 140 and an instrument 144 can then be tracked relative to the subject 28 to allow for a navigated procedure. The instrument 144 can include a tracking device, such as an optical tracking device 148 and/or an electromagnetic tracking device 152 to allow for tracking of the instrument 144 with either or both of the optical localizer 130 or the electromagnetic localizer 138. A navigation/probe interface device 158 may have communications (e.g., wired or wireless) with the instrument 144 (e.g., via a communication line 156), with the electromagnetic localizer 138 (e.g., via a communication line 162), and/or the optical localizer 130 (e.g., via a communication line 166). The interface 158 can also communicate with the processor 56 with a communication line 168 and may communicate information (e.g., signals) regarding the various items connected to the interface 158. It will be understood that any of the communication lines can be wired, wireless, physical media transmission or movement, or any other appropriate communication. Nevertheless, the appropriate communication systems can be provided with the respective localizers to allow for tracking of the instrument 144 relative to the subject 28 to allow for illustration of a tracked location of the instrument 144 relative to the image 40 for performing a procedure.

One skilled in the art will understand that the instrument 144 may be any appropriate instrument, such as a ventricular or vascular stent, spinal implant, neurological stent or stimulator, ablation device, or the like. The instrument 144 can be an interventional instrument or can include or be an implantable device. Tracking the instrument 144 allows for viewing a location (including x,y,z position and orientation) of the instrument 144 relative to the subject 28 with use of the registered image 40 without direct viewing of the instrument 144 within the subject 28.

Further, the imaging system 36, such as the gantry 70, can include an optical tracking device 174 and/or an electromagnetic tracking device 178 to be tracked with the respective optical localizer 130 and/or electromagnetic localizer 138. Accordingly, the imaging device 36 can be tracked relative to the subject 28 as can the instrument 144 to allow for initial registration, automatic registration, or continued registration of the subject 28 relative to the image 40. Registration and navigated procedures are discussed in the above incorporated U.S. Pat. No. 8,238,631, incorporated herein by reference. Upon registration and tracking of the instrument 144, an icon 180 may be displayed relative to, including overlaid on, the image 40.

With continuing reference to FIG. 2, according to various embodiments, the source 74 can include a single x-ray tube assembly 190 that can be connected to a switch 194 that can interconnect a first power source 198 via a connection or power line 200. As discussed above, X-rays can be emitted from the x-ray tube 190 generally in the cone shape 90 towards the detector 78 and generally in the direction from the x-ray tube 190 as indicated by arrow, beam arrow, beam, or vector 94. The switch 194 can switch power on or off to the tube 190 to emit x-rays of selected characteristics, as is understood by one skilled in the art. The vector 94 may be a central vector or ray within the cone 90 of x-rays. An x-ray beam may be emitted as the cone 90 or other appropriate geometry. The vector 94 may include a selected line or axis relevant for further interaction with the beam, such as with a filter member, as discussed further herein.

The subject 28 can be positioned within the x-ray cone 94 to allow for acquiring image data of the subject 28 based upon the emission of x-rays in the direction of vector 94 towards the detector 78.

The x-ray tube 190 may be used to generate two-dimension (2D) x-ray projections of the subject 28, including selected portions of the subject 28, or any area, region or volume of interest, in light of the x-rays impinging upon or being detected on a 2D or flat panel detector, as the detector 78. The 2D x-ray projections can be reconstructed, as discussed herein, to generate and/or display three-dimensional (3D) volumetric models of the subject 28, selected portion of the subject 28, or any area, region, or volume of interest. As discussed herein, the 2D x-ray projections can be image data acquired with the imaging system 36, while the 3D volumetric models can be generated or model image data.

For reconstructing or forming the 3D volumetric image, appropriate algebraic techniques include Expectation Maximization (EM), Ordered Subsets EM (OS-EM), Simultaneous Algebraic Reconstruction Technique (SART) and Total Variation Minimization (TVM), as generally understood by those skilled in the art. The application to perform a 3D volumetric reconstruction based on the 2D projections allows for efficient and complete volumetric reconstruction. Generally, an algebraic technique can include an iterative process to perform a reconstruction of the subject 28 for display as the image 40. For example, a pure or theoretical image data projection, such as those based on or generated from an atlas or stylized model of a "theoretical" patient, can be iteratively changed until the theoretical projection images match the acquired 2D projection image data of the subject 28. Then, the stylized model can be appropriately altered as the 3D volumetric reconstruction model of the acquired 2D projection image data of the selected subject 28 and can be used in a surgical intervention, such as navigation, diagnosis, or planning. The theoretical model can be associated with theoretical image data to construct the theoretical model. In this way, the model, or the image data 40 can be built based upon image data acquired of the subject 28 with the imaging device 36.

With continuing reference to FIG. 2, the source 74 may include various elements or features that may be moved relative to the x-ray tube 190. In various embodiments, for example, a collimator 220 may be positioned relative to the x-ray tube 190 to assist in forming the cone 90 relative to the subject 28. The collimator 220 may include various features such as movable members that may assist in positioning one or more filters within the cone 90 of the x-rays prior to reaching the subject 28. Further, as discussed further herein, various filters may be used to shape the x-ray beam, such as shaping the cone 90, into a selected shape prior to reaching the subject 28. In various embodiments, as discussed herein, the x-rays may be formed into a thin fan or plane to reach and pass through the subject 28 and be detected by the detector 78. Accordingly, the source 74 including the collimator 220 may include a filter assembly 224. The filter assembly 224 may include one or more portions that allow for moving a filter relative to the x-ray tube 190 to shape and/or position the x-rays prior to reaching the subject 28.

Figure 3:
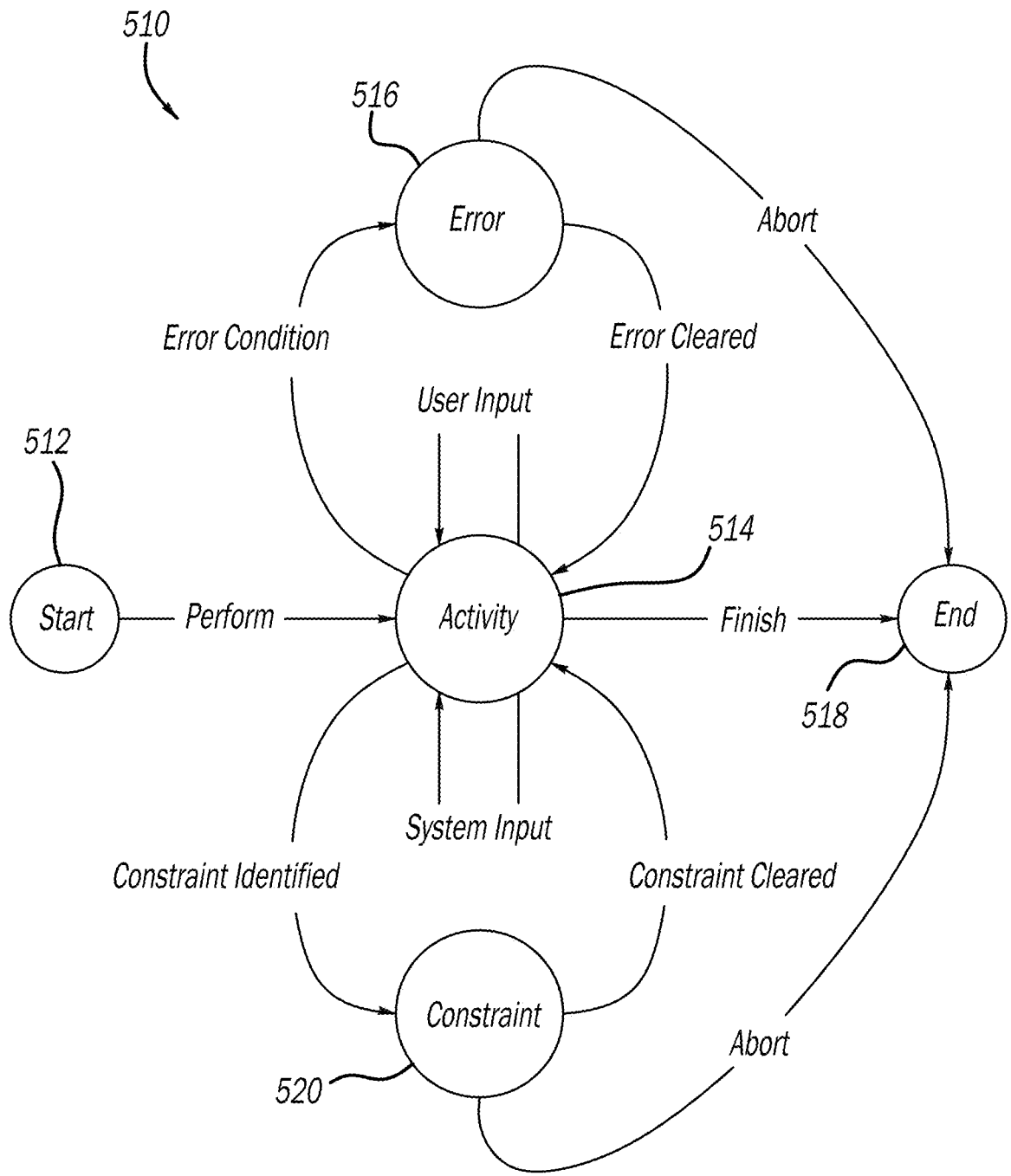
FIG. 3 is a flow chart of an exemplary method for performing medical imaging using the imaging system of FIG. 1 or any other suitable imaging system.

With reference to FIG. 3, an exemplary method for operating any suitable imaging system, such as the imaging system 36, is illustrated at reference numeral 510. The method 510 is performed by the imaging system 36 in any suitable manner. For the example, part or all of the method 510 may be executed by the processor 56 of the processor system 48 according to code saved in the memory 58, the code configured to execute the method 510; and/or part or all of the method 510 may be executed by the processor 66 of the control system 64 according to code saved in the memory 68.

The method 510 starts at block 512 and proceeds to block 514. At block 514, any suitable user or system input calling for a particular activity to be performed is entered to the imaging system 36, such as by way of the input device 52 and/or the control system 64. If an error condition is detected by the imaging system 36 at block 516, the processor system 48 and/or the control system 64 operate to attempt to clear the error by providing instructions to the user for overcoming the error condition. Once the error condition is overcome and the error is cleared, the method returns to block 514. If the error cannot be cleared, the method 510 aborts the activity and the method 510 is terminated at block 518.

If at block 514 the imaging system 36 identifies an operational constraint that will prevent the activity from being performed, the processor system 48 and/or the control system 64 will provide instructions to the user for clearing the constraint at block 520. Exemplary constraints include, but are not limited to, the following: Tilt/Wag!=0°; Navigation Not Connected; Navigation Not Compatible; Minimum Scan Length Not Achieved; Maximum Scan Length Exceeded; X-ray Tube Temperature Will Exceed Acceptable Limits; O-arm Tracker Visibility; Patient Reference Tracker Visibility; Preparing for Acquisition; Gantry Motion along restricted axis. The constraint may be cleared automatically by the processor system 48, or the constraint remains at block 520 until the user performs the operation to clear the constraint or aborts the operation 510. If the constraint is cleared, the method 510 returns to block 514 where the processor system 48 and/or the control system 64 perform the activity. If the constraint is not cleared, the method 510 aborts the activity and the method is terminated at block 518. The constraint can either be cleared automatically by the processor system 48, or the constraint remains at block 520 until the user performs the operation to clear the constraint or aborts the operation 510. If there is no error or constraint preventing the activity from being performed, the processor system 48 and/or the control system 64 perform the activity at 514. After the activity is complete, the method 510 ends at block 518.

Figure 4:
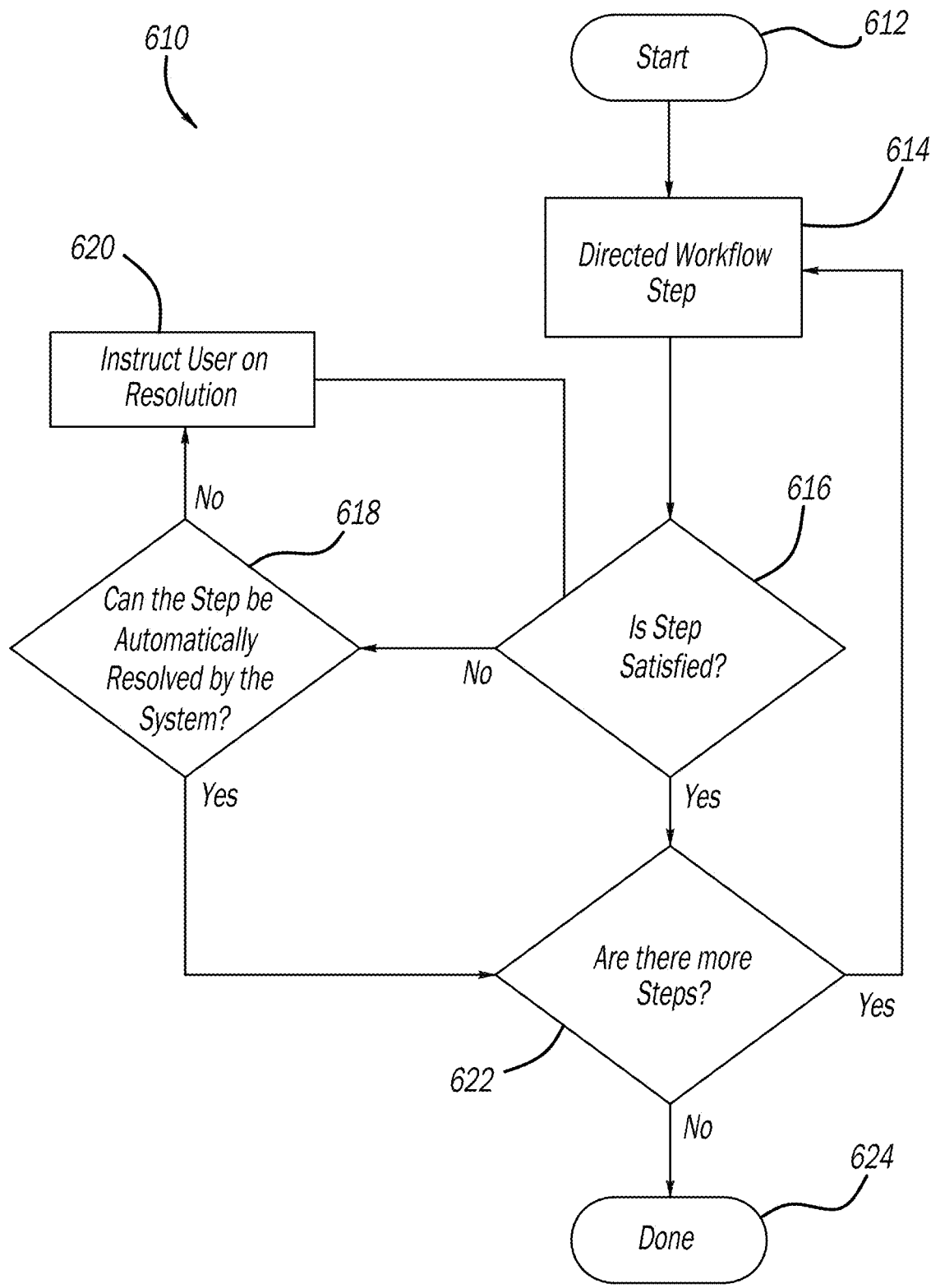
FIG. 4 is a flow chart of another exemplary method for performing medical imaging in accordance with the present disclosure.
Figure 5A:
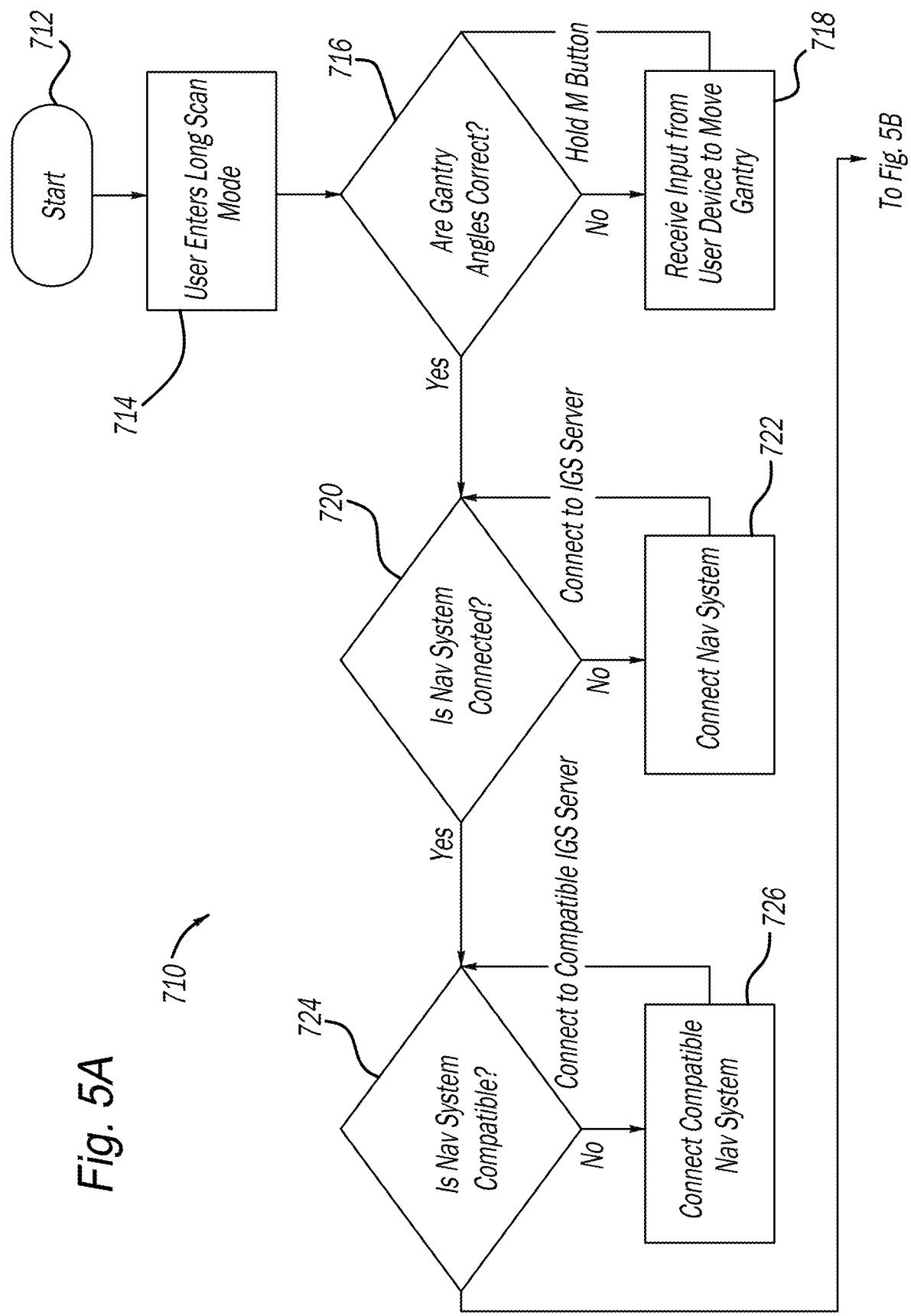
Figure 5B:
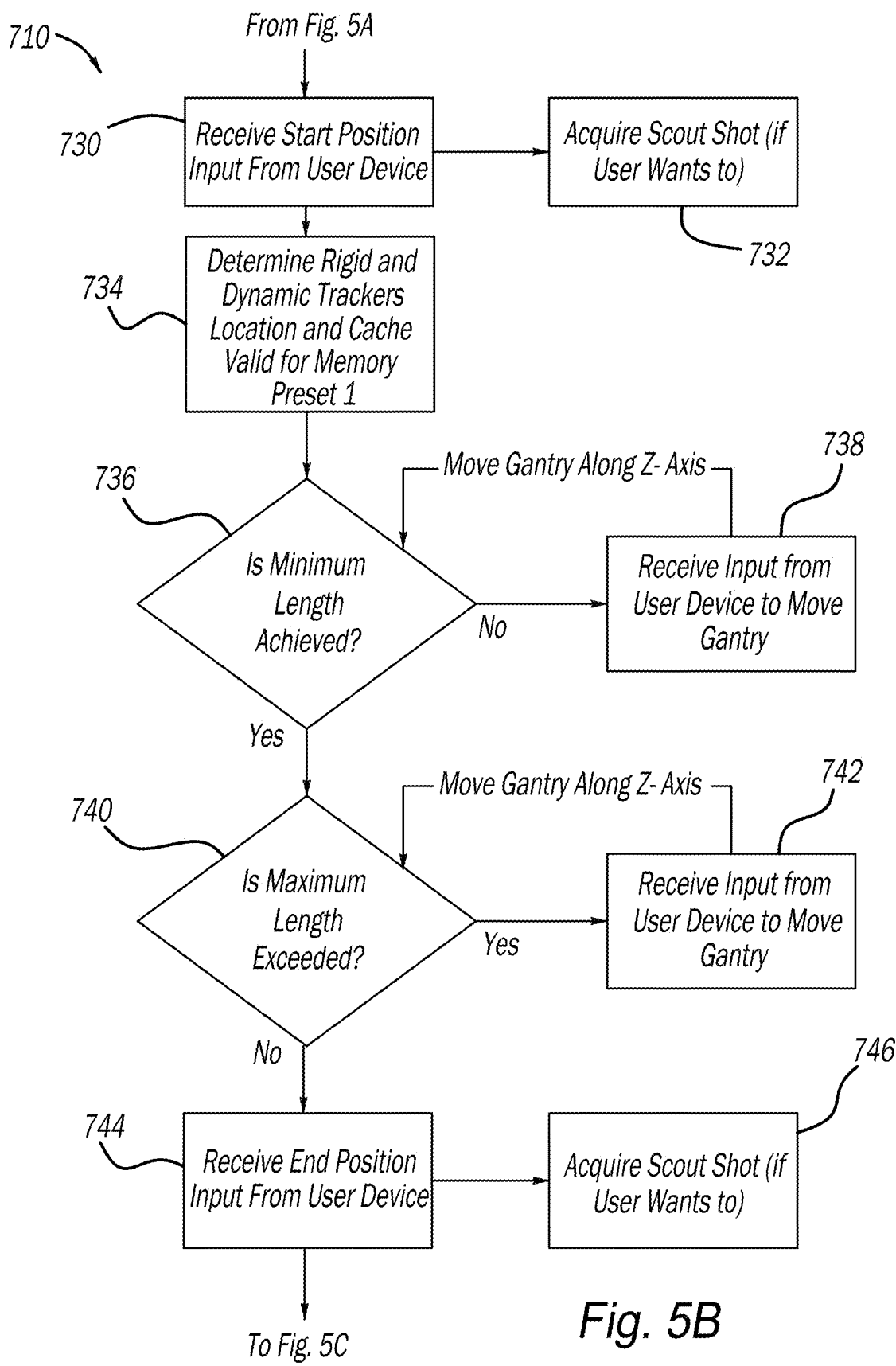
Figure 5C:
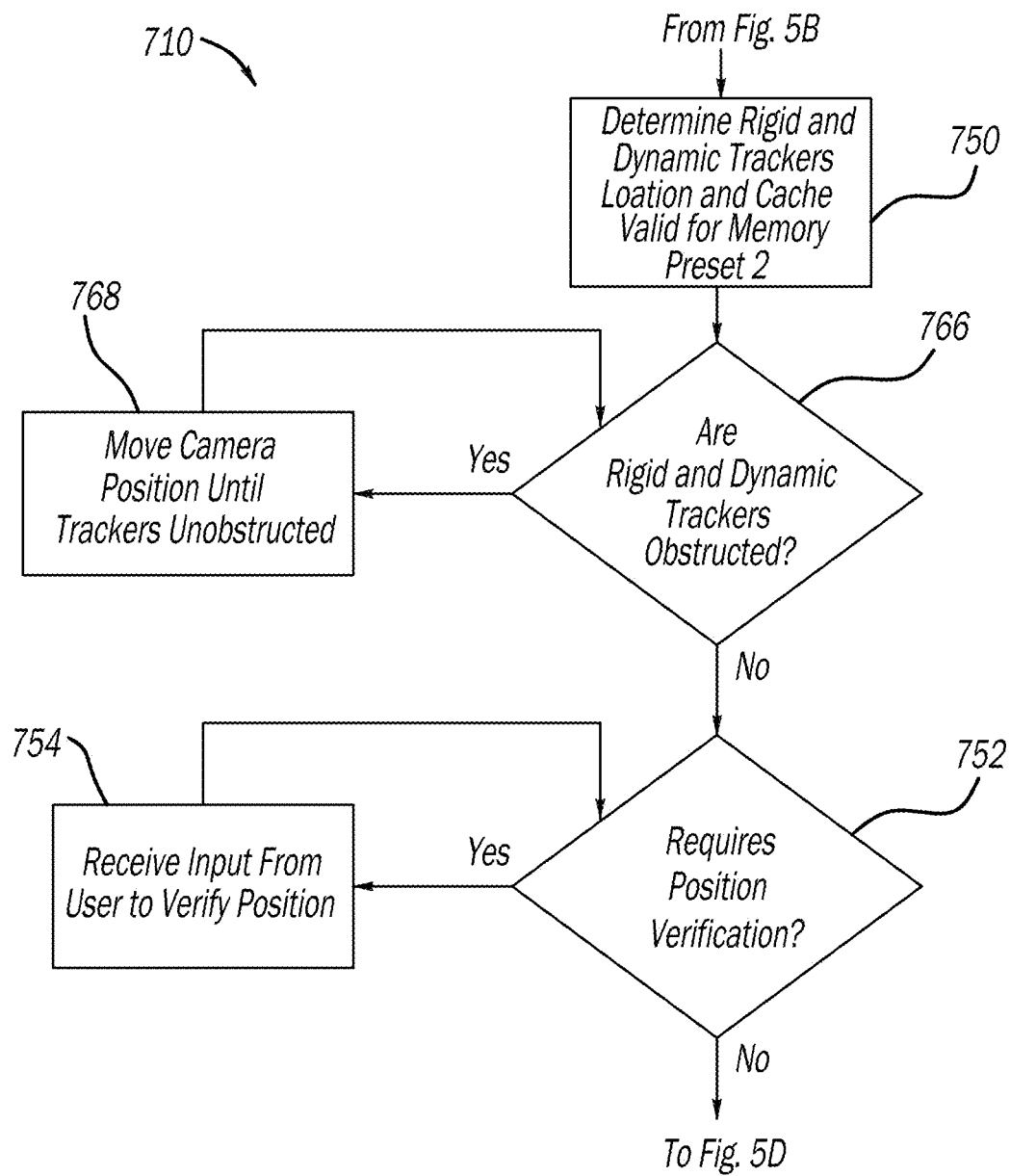
Figure 5D:
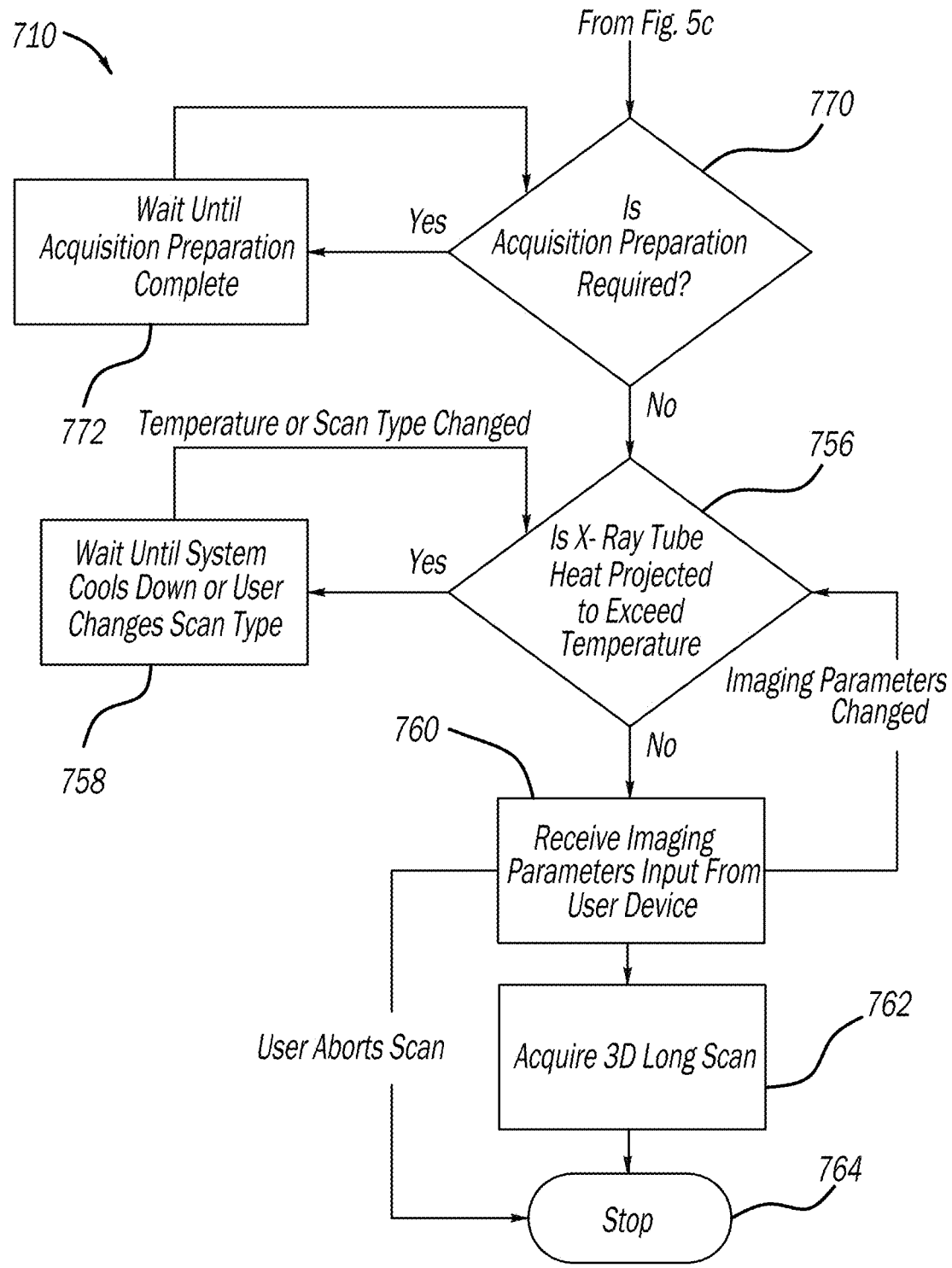

FIG. 4 illustrates another method 610 in accordance with the present disclosure. The method 610 is performed by the imaging system 36 in any suitable manner. For the example, part or all of the method 610 may be executed by the processor 56 of the processor system 48 according to code saved in the memory 58, the code configured to execute the method 610; and/or part or all of the method 610 may be executed by the processor 66 of the control system 64 according to code saved in the memory 68.

The method 610 starts at block 612 and proceeds to block 614. At block 614, any suitable user or system input calling for any suitable step to be performed is entered to the imaging system 36, such as by way of the input device 52 and/or the control system 64. Exemplary workflow steps are set forth herein in the descriptions of methods 710 and 810. From block 614, the method 610 proceeds to block 616, where the processor system 48 and/or the control system 64 determine whether or not the workflow step is satisfied. If the workflow step has not been satisfied, then the method 610 proceeds to block 618.

At block 618 the processor system 48 and/or the control system 64 determine whether or not the workflow step can be automatically resolved by the imaging system 36. If the workflow step cannot be resolved by the imaging system 36, the method 610 proceeds to block 620. At block 620, the processor system 48 and/or the control system 64 instruct the user on how to resolve the workflow step to satisfy the workflow step. From block 620, the method 610 returns to block 616. If at block 618 the processor system 48 and/or the control system 64 determine that the workflow step can be automatically resolved by the imaging system 36, the processor system 48 and/or the control system 64 resolve the directed workflow step of block 614 and the method 610 proceeds to block 622. The workflow step can be automatically resolved by, for example, a tube temperature constraint whereby the system 36 monitors the tube temperature, and when the temperature is within tolerance the system 36 automatically clears the error. The workflow step may also be automatically resolved by rigid and dynamic tracker verification, whereby when communicating with a compatible navigation system the system 36 automatically verifies tracker visibility and camera motion. Still further, the workflow step may be automatically resolved by preparing the system 36 for acquisition by moving the rotor to correct the starting position and by opening the collimator.

The method 610 also proceeds to block 622 from block 616 when at block 616 the processor system 48 and/or the control system 64 determine that the workflow step has been satisfied. If at block 622 the processor system 48 and/or the control system 64 identify that additional directed workflow steps have been input to the processor system 48 and/or the control system 64, the method returns to block 614. If at block 622 the processor system 48 and/or the control system 64 determine that no additional directed workflow steps have been input, then the method 610 concludes at block 624.

FIGS. 5A, 5B, 5C, and 5D illustrate another method in accordance with the present disclosure at reference numeral 710. The method 710 is generally for using the imaging system 36, or any other suitable imaging system, for producing a three-dimensional long scan of a subject. The method 710 is performed by the imaging system 36 in any suitable manner. For example, part or all of the method 710 may be executed by the processor 56 of the processor system 48 according to code saved in the memory 58, the code configured to execute the method 710; and/or part or all of the method 710 may be executed by the processor 66 of the control system 64 according to code saved in the memory 68.

The method 710 starts at block 712. From block 712, the method 710 proceeds to block 714, where the imaging system 36 is placed in a long scan mode. The imaging system 36 may be placed in the long scan mode at block 714 in any suitable manner, such as in response to inputs from a user entered into the processor system 48 and/or the control system 64.

From block 714, the method 710 proceeds to block 716. At block 716, the imaging system 36 determines whether or not the gantry tilt angle and gantry wag angle is correct. More specifically, in many applications the gantry tilt angle and the gantry wag angle of the imaging gantry 70 must be 0° to properly stitch volumes together. Stitching is described further in U.S. patent application Ser. No. 17/205,940 titled "Imaging System," which was filed on Mar. 18, 2021 and was assigned to Medtronic Navigation, Inc. of Louisville, Co. The entirety of U.S. application Ser. No. 17/205,940 is incorporated herein by reference. If one or both of the gantry tilt and gantry wag angles are not 0°, the method 710 proceeds to block 718. At block 718, the imaging system 36 provides instructions to the user for resetting the gantry tilt angle and/or the gantry wag angle of the imaging gantry 70 to 0°. In some applications, holding the "M" button of the imaging system 36 will reset the gantry tilt and gantry wag angles to 0°. Alternatively, at block 718 the method 710 may be configured to give the user the option to abort the workflow if the gantry tilt and/or gantry wag angles cannot be set to 0°. After the gantry tilt and gantry wag angles are reset to 0°, the method 710 proceeds from block 716 to block 720.

At block 720, the system 710 determines whether or not the imaging system 36 is connected to a surgical navigation system. More specifically, the processor system 48 and/or the control system 64 determine whether or not the imaging system 36 is connected to a DICOM compatible StealthStation or MazorX system (both provided by Medtronic, Inc.) by way of a hardwire connection, and the navigation system is selected within a MVS application. If at block 720 the imaging system 36 is determined to not be connected to a navigation system, at block 722 the imaging system 36 provides instructions to the user for connecting the imaging system 36 to a navigation system, or for alternatively aborting the workflow. Once the imaging system 36 is connected to a suitable navigation system, such as by connecting to an IGS server, the method 710 proceeds from block 720 to block 724.

At block 724, the method 710 determines whether or not the connected navigation system is compatible with the imaging system 36. Compatible navigation systems include, but are not limited to, surgical navigation systems configured to communicate over a proprietary NAVCOM protocol (protocol versions 3.0.0 or 4.0.0 are supported, for example). Exemplary navigation systems configured for communicating over a proprietary NAVCOM protocol include, but not are not limited to, StealthStation S8, and MazorX platforms. If at block 724 the imaging system 36 determines that the connected navigation system is not a compatible system, the method 710 proceeds to block 726. At block 726, the control system 64 displays instructions to the user for resolving the issue of being connected to an incompatible navigation system server, or to alternatively abort the scanning operation. Once the imaging system 36 is connected to a compatible IGS server, the method 710 proceeds from block 724 to block 730 of FIG. 5A.

At block 730, the imaging system 36 receives a start position input from a user device. At block 732, the user may optionally acquire a scout shot. More specifically, at blocks 730 and 732 the user manually specifies the starting position by moving the imaging gantry 70 along the Z axis and storing the start position in memory 68 of the control system 64, such as at a memory preset number one. The user may take one or more 2D fluoroscopic scout images to ensure that they are in the correct position. Once the start position is specified, the message 710 proceeds from block 730 to block 734.

At block 734, the imaging system 36 determines the location of rigid and dynamic trackers, and cache valid for the memory preset where the starting position was stored at block 730, such as memory preset number one. The imaging system 36 is configured to automatically verify line of sight visibility between the connected navigation system's camera and the rigid dynamic trackers (such as a patient reference tracker and an O-arm tracker). From block 734, the method 710 proceeds to block 736.

At block 736, the imaging system 36 checks whether or not the current Z-axis position of the imaging gantry 70 will result in a long scan that meets a minimum length to be clinically valuable. If such minimum length cannot be achieved with the imaging gantry 70 in the current Z-axis position, the method proceeds from block 736 to block 738. At block 738, the imaging system 36 provides instructions to the user by way of the control system 64, for example, for moving the imaging gantry 70 along the Z-axis to increase the length of the scan. From block 738, the method returns to block 736 where the position of the Z-axis is again checked to determine whether the position will result in a long scan of a minimum length to be clinically valuable. Once the minimum scan length has been achieved, the method 710 proceeds from block 736 to block 740.

At block 740, the imaging system 36 checks whether the current Z-axis position will not result in a longer scan than can safely or technically meet navigational accuracy. If at block 740 it is determined that the position of the Z-axis will result in a scan exceeding a maximum length, the method 710 proceeds to block 742. At block 742, the imaging system 36 displays instructions to the user, such as by way of the control system 64, for moving the imaging gantry 70 along the Z-axis to decrease the scan length. Based on the instructions, the user then may input instructions to the control system 64 for moving the imaging gantry 70 to a position along the Z-axis that will result in a long scan not exceeding a maximum length. Once the imaging gantry 70 is in a position sufficient to generate a long scan that does not exceed the maximum length, the method 710 proceeds from block 740 to block 744.

At block 744, the imaging system 36 receives an end position input from the user by way of the control system 64. More specifically, the user manually specifies the ending position by moving the imaging gantry 70 along the Z-axis, and stores the end position in the memory 68, such as at memory preset two. During this process, the user may take one or more 2D fluoroscopic scout images (see block 746) to ensure that the imaging gantry 70 is in the correct position. From block 744, the method 710 proceeds to block 750 of FIG. 5C.

At block 750, the imaging system 36 verifies line of sight visibility between the connected navigation system camera and the rigid dynamic trackers (patient reference tracker, O-arm tracker). Cache valid for memory preset number two is also determined at block 750. From block 750, the method proceeds to block 766.

At block 766, the imaging system 36 determines whether the rigid and dynamic trackers are obstructed. If there is an obstruction, at block 768 the imaging system 36 instructs the user 24 to change the position of the optical localizer 130 until the trackers are unobstructed. Once the system 36 determines that the rigid and dynamic trackers are unobstructed, the method proceeds to block 752.

At block 752, the imaging system 36 determines whether position verification is required. More specifically, if the trackers cannot be seen at stored presets, then the user is asked by way of the control system 64 to verify the camera positions at both stored preset positions (memory preset one and memory preset two). The current position is automatically verified or instructions are displayed to the user by way of the control system 64 to adjust the camera. The control system 64 then provides instructions to the user for verifying the additional stored position. If at block 752 position verification is required, the method 710 proceeds to block 754. At block 754, the control system 64 is configured to receive input from the user to verify the position of the camera. Specifically, depending on the current position, the control system 64 instructs the user to verify the other position by instructing the user to press the corresponding memory preset (1 or 2), and the imaging system 36 automatically verifies the line of sight visibility to the tracker. The method 710 then proceeds from block 754 to block 752. From block 752, the method 710 proceeds to block 770.

At block 770, the imaging system 36 determines whether acquisition preparation is required. If acquisition preparation is required, then the method 710 proceeds to block 772. At block 772, the method 710 waits until acquisition preparation is complete. Once acquisition preparation is complete, the method 710 proceeds from block 770 to block 756.

At block 756, the control system 64 is configured to determine whether or not heat generated by the X-ray tube of the imaging system 36 is projected to exceed a predetermined temperature. X-ray generation results and heat within the X-ray tube of the imaging system 36. The processor 66 of the control system 64 is configured to predict how much heat will be generated, and prevent acquisition of X-ray images if the heat predicted to be generated will exceed predetermined heat limits beyond which the X-ray tube may be damaged. If at block 756 the control system 64 determines that the heat generated will be excessive, the method 710 proceeds from block 756 to block 758. At block 758, the control system 64 is configured to instruct the user to wait until the system cools down before requesting additional images. The control system 64 is also configured to alternatively provide the user with scan parameter options that will potentially reduce the X-ray dosage and wait time. Still further, the control system 64 is configured to give the user the option to abort the current scan workflow and modify the X-ray parameters in order to take scans predicted to generate less heat. Once the X-ray tube heat predicted to be generated is at or below a threshold predetermined to be safe, method 710 proceeds from block 756 to block 760.

At block 760, the control system 64 is configured to receive imaging parameters input from the user. More specifically, at block 760, the imaging system 36 is ready for X-ray acquisition. The user may modify certain acquisition parameters that may affect the projected X-ray tube temperature, or choose to abort the scan. If the user chooses to abort the scan and inputs an abort command to the control system 64, the method 710 proceeds from block 760 to block 764 where the method 710 concludes and the imaging process is stopped. If at block 760 the user decides to proceed with the scan, the method 710 proceeds to block 762. At block 762, the user activates X-ray acquisition using any suitable hand switch or foot switch of the control system 64 to acquire a 3D long scan image. The x-ray acquisition typically includes three scans—an upper scan, a lower scan, and a middle scan. With respect to the middle scan, the system 20 includes a collimator that blocks out portions of the subject that have already been X-rayed so portions of the anatomy are not scanned twice.

The present disclosure is not limited to 3D long scans. For example and with reference to FIGS. 6A, 6B, and 6C, the present disclosure further includes a method 810 for acquiring a 2D long scan. The method 810 is generally for using the imaging system 36, or any other suitable imaging system, for producing a two-dimensional long scan of a subject. The method 810 is performed by the imaging system 36 in any suitable manner. For example, part or all of the method 810 may be executed by the processor 56 of the processor system 48 according to code saved in the memory 58, the code configured to execute the method 810; and/or part or all of the method 810 may be executed by the processor 66 of the control system 64 according to code saved in the memory 68.

The method 810 starts at block 812, and at block 814 the user selects a long scan from the control system 64 to place the imaging system 36 in a long scan mode. From block 814, the method 810 precedes the block 816. At block 816, the control system 64 checks whether or not the imaging system 36 is ready for 2D fluoroscopic acquisition. If the imaging system 36 is not ready (e.g., the gantry angles are not correct), the method 810 proceeds from block 816 to block 818. At block 818, the control system 64 checks whether or not the gantry angles of the imaging gantry 70 are correct. Block 818 is the same as, or substantially similar to, block 716. Thus, the description of block 716 also applies to block 818. If at block 818 the gantry angles are not correct, the method 810 proceeds to block 820. At block 820, the control system 64 receives inputs from the user for positioning the imaging gantry 70 at the correct angles of 0° for the gantry tilt angle and the gantry wag angle. Block 820 is similar to block 718. Thus, the description of block 718 also applies to block 820. Once the gantry angles are set correctly, the method 810 proceeds from block 818 to block 822. The method 810 may also proceed from block 816 directly to block 822.

At block 822, the control system 64 receives a start position input from the user. Block 822 is similar to block 730, thus the description of block 730 also applies to block 822. At block 824, the method 810 includes acquiring scout shots of the subject similar to block 732. From block 822, the method 810 proceeds to block 830 of FIG. 6B. At block 832, the control system 64 determines whether or not the imaging gantry 70 is set at a position along the Z-axis sufficient to obtain a long scan of a usable length. If not, the method 810 proceeds to block 834, where the control system 64 generates instructions to the user for moving the imaging gantry 70 along the Z-axis to obtain a long scan of sufficient length, and the control system 64 is configured to receive inputs from the user to move the imaging gantry 70 to obtain a long scan of a sufficient length. Blocks 832 and 834 are similar to blocks 736 and 738 of the method 710, and thus the description of blocks 736 and 738 also applies to blocks 832 and 834.

From block 832, the method 810 proceeds to block 836. At block 836, the control system 64 is configured to determine whether the setting of the imaging gantry 70 along the Z-axis is sufficient to obtain a long scan that does not exceed a maximum length. If the position of the imaging gantry 70 will result in the maximum length being exceeded, the method 10 proceeds to block 838. At block 838, the control system 64 is configured to provide instructions to the user for moving the imaging gantry 70 along the Z-axis to a position that will result in the long scan not exceeding the predetermined length. Also at block 838, the control system 64 is configured to receive inputs from the user for repositioning the imaging gantry 70. Blocks 836 and 838 are similar to blocks 740 and 742 of the method 710, and thus the description of block 740 and 742 also applies to blocks 836 and 838.

From block 836, the method 810 proceeds to block 840. Blocks 840 and 842 of the method 810 are substantially similar to blocks 744 and 746 of the method 710. Thus, the description of blocks 744 and 746 also applies to blocks 840 and 842.

From block 840, the method 810 proceeds to block 844. At block 844, the end position of the long scan is set by the control system 64 as preset two. From block 844, the method 810 proceeds to block 852. At block 852, the method 810 determines whether the x-ray tube heat is projected to exceed a predetermined temperature. If yes, then the method 810 proceeds to block 758. At block 758, the method 810 waits until the system cools or the scan type is changed. Once the x-ray tube heat is projected to not exceed the predetermined temperature, the method 810 proceeds from block 756 to block 760.

At block 846, the control system 64 is configured to receive imaging parameter inputs from the user. Block 846 is similar to block 760 of method 710, and thus the description of block 760 also applies to block 846. At block 846, the user has the option of aborting the scan. If the user decides to abort the scan, the method 810 proceeds to block 850 where the method 810 ends. If at block 846 the user proceeds with the scan, the method 810 advances to block 848, where the 2D long scan is acquired. After the 2D long scan is complete, the method 810 ends at block 850.

The present disclosure thus advantageously provides numerous advantages. For example, setting up an imaging system including an O-arm imaging gantry may traditionally require extra time, which is very valuable in an operating room setting. Although most X-ray scanner systems are configured to adhere to typical radiology scanners, it may still be tedious for a radiological technician to memorize the unique attributes of each scanner system for a typical need during surgery. Furthermore, operating room time is very costly, and delay in a surgical case due to setup delays subsequent cases and reduces the overall efficiency of the radiological department. The present disclosure addresses these issues by providing the control system 64 with a quick, easy, and efficient workflow for a user of the imaging system 36 to lead the user through a series of well-defined steps for setting up the imaging system 36, or any other suitable compatible imaging system. For example and with respect to three-dimensional long scan imaging, a radiological technician can easily use the control system 64 and the methods 510, 610, 710, and 810 to set up the imaging system 36 for a three-dimensional long scan without any prior knowledge of the imaging system 36 because the imaging system 36 (by way of the methods 510, 610, 710, and 810) advantageously inform the user of any corrections that need to be made prior to acquiring the three-dimensional long scan image. One skilled in the art will appreciate that the present disclosure is equally applicable to two-dimensional long scan imaging, as well as any other suitable imaging.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. An imaging system for generating image data of a subject, the imaging system comprising:
 a radiation emitter for emitting radiation through the subject;
 a radiation detector for detecting radiation from the radiation emitter that has passed through the subject;
 an imaging assembly including the radiation emitter and the radiation detector, the imaging assembly configured to move the radiation emitter and the radiation detector relative to the subject; and
 a control system configured to:
  identify positions of the radiation emitter and the radiation detector relative to the subject prior to emitting radiation through the subject with the radiation emitter and the radiation detector;
  notify a user of the imaging system when either one of the radiation emitter and the radiation detector is not at a predetermined start angle relative to the subject prior to emitting radiation through the subject with the radiation emitter and the radiation detector;
  when either one of the radiation emitter and the radiation detector is not at the predetermined start angle relative to the subject prior to emitting radiation through the subject with the radiation emitter and the radiation detector, generate and display instructions to the user by way of a user interface for adjusting the imaging assembly so that the radiation emitter and the radiation detector are both at the predetermined start angle relative to the subject prior to emitting radiation through the subject with the radiation emitter and the radiation detector; and
  restrict operation of the radiation emitter to emit radiation until both the radiation emitter and the radiation detector are at the predetermined start angle relative to the subject and prior to emitting radiation through the subject with the radiation emitter and the radiation detector;
 wherein the control system is further configured to:
 detect whether a surgical navigation system is connected to the imaging system, and provide instructions to the user for connecting a surgical navigation system if there is no surgical navigation system connected to the imaging system; and
 detect whether the surgical navigation system connected to the imaging system is compatible with the imaging system, and if the surgical navigation system is not compatible, provide instructions to the user for connecting a compatible surgical navigation system.

2. The imaging system of claim 1, wherein the radiation emitter is configured to emit x-rays, and the radiation detector is configured to detect x-rays.

3. The imaging system of claim 1, wherein the imaging assembly includes an o-arm housing the radiation emitter and the radiation detector.

4. The imaging system of claim 1, wherein the imaging assembly includes a c-arm housing the radiation emitter and the radiation detector.

5. The imaging system of claim 1, wherein the image data is configured to generate a three-dimensional image of the subject.

6. The imaging system of claim 1, wherein the image data is configured to generate a two-dimensional image of the subject.

7. The imaging system of claim 1, wherein the predetermined start angle of the radiation emitter is 0° relative to a longitudinal axis of the subject and 0° relative to a transverse axis extending perpendicular to the longitudinal axis of the subject.

8. The imaging system of claim 1, wherein the predetermined start angle of the radiation detector is 0° relative to a longitudinal axis of the subject and 0° relative to a transverse axis extending perpendicular to the longitudinal axis of the subject.

9. An imaging system for generating an x-ray image of a subject, the imaging system comprising:
 an imaging gantry including an x-ray emitter for emitting x-rays through the subject and an x-ray detector for detecting the x-rays that have passed through the subject, wherein the imaging gantry is movable relative to the subject; and
 a control system configured to:
  identify a position of the imaging gantry prior to emitting x-rays through the subject using the x-ray emitter and the x-ray detector for imaging the subject, including a gantry wag angle and a gantry tilt angle of the imaging gantry;
  notify a user of the imaging system when the gantry wag angle and the gantry tilt angle are at angles other than 0° prior to emitting x-rays through the subject using the x-ray emitter and the x-ray detector for imaging the subject;
  when at least one of the gantry wag angle and the gantry tilt angle are not at 0° prior to emitting x-rays through the subject using the x-ray emitter and the x-ray detector for imaging the subject, generate and display instructions to the user by way of a user interface for adjusting the imaging gantry so the gantry wag angle and the gantry tilt angle are at 0° prior to emitting x-rays through the subject using the x-ray emitter and the x-ray detector for imaging the subject; and
  restrict operation of the x-ray emitter until the gantry wag angle and the gantry tilt angle are at 0° prior to emitting x-rays through the subject using the x-ray emitter and the x-ray detector for imaging the subject.

10. The imaging system of claim 9, wherein the control system is further configured to:
 detect whether a surgical navigation system is connected to the imaging system, and provide instructions to the user for connecting a surgical navigation system if there is no surgical navigation system connected to the imaging system; and
 detect whether a surgical navigation system connected to the imaging system is compatible with the imaging system, and if the surgical navigation system is not compatible, provide instructions to the user for connecting a compatible surgical navigation system.

11. The imaging system of claim 10, wherein the control system is further configured to determine line of sight visibility between a localizer and a subject tracker at both a start position and an end position of the imaging gantry along a longitudinal axis of the subject, including providing instructions to the user for moving the imaging gantry to the start position where the control system checks the line of sight visibility and the end position where the control system checks the line of sight visibility; and wherein if there is no line of sight visibility at either the start position or the end position, the control system is configured to provide instructions to the user for positioning at least one of the localizer and the subject tracker to provide line of slight visibility therebetween at both the start position and the end position of the imaging gantry.

12. The imaging system of claim 9, wherein the control system is further configured to:

prior to imaging the subject, identify a start position of the imaging gantry relative to a longitudinal axis of the subject;

determine whether the start position of the imaging gantry is sufficient to produce an x-ray image of at least a predetermined minimal length; and if the start position of the imaging gantry is not sufficient to produce an x-ray image of at least the predetermined minimal length, generate instructions to the user for repositioning the imaging gantry so that at an x-ray image of at least the predetermined minimal length will be obtained from the start position.

13. The imaging system of claim 9, wherein the control system is further configured to:

prior to imaging the subject, identify a start position of the imaging gantry relative to a longitudinal axis of the subject;

determine whether the start position of the imaging gantry will result in an x-ray image that is greater than a predetermined maximum length; and if the start position of the imaging gantry will result in an image that is greater than the predetermined maximum length, generate instructions to the user for repositioning the imaging gantry so that an x-ray image that is no greater than the predetermined maximum length will be obtained from the start position.

14. The imaging system of claim 9, wherein the control system is further configured to prompt the user to move the imaging gantry to an end position over the subject where the x-ray image is to end to identify an end point of the x-ray image.

15. The imaging system of claim 14, wherein the control system is configured to prompt the user to take a fluoroscopic scout image at the end position to verify accuracy of the end position.

16. The imaging system of claim 9, wherein the control system is further configured to determine whether the x-ray image with parameters requested by the user will result in the x-ray emitter overheating; and wherein when the control system determines that the parameters requested by the user will result in the x-ray emitter overheating, the control system is configured to prevent activation of the x-ray emitter until the user selects x-ray parameters that will not result in overheating.

17. The imaging system of claim 9, wherein the imaging system is configured to generate a three-dimensional long scan image.

18. The imaging system of claim 9, wherein the imaging system is configured to generate a two-dimensional long scan image.

19. A method for setting an imaging system to generate an x-ray image of a subject, the imaging system including a control module and an imaging gantry having an x-ray emitter for emitting x-rays through the subject and an x-ray detector for detecting the x-rays that have passed through the subject, the imaging gantry is movable relative to the subject, the method performed by the control module, the method comprising:

identifying a position of the imaging gantry prior to emitting x-rays through the subject using the x-ray emitter and the x-ray detector to image the subject, including a gantry wag angle and a gantry tilt angle of the imaging gantry;

notifying a user of the imaging system when the gantry wag angle and the gantry tilt angle are at angles other than 0° prior to emitting x-rays through the subject using the x-ray emitter and the x-ray detector to image the subject;

when at least one of the gantry wag angle and the gantry tilt angle are not at 0° prior to emitting x-rays through the subject using the x-ray emitter and the x-ray detector to image the subject, generating and displaying instructions to the user by way of a user interface for adjusting the imaging gantry so the gantry wag angle and the gantry tilt angle are at 0°; and restricting operation of the x-ray emitter until the gantry wag angle and the gantry tilt angle are at 0° prior to emitting x-rays through the subject using the x-ray emitter and the x-ray detector to image the subject.

* * * * *